Figure 1:
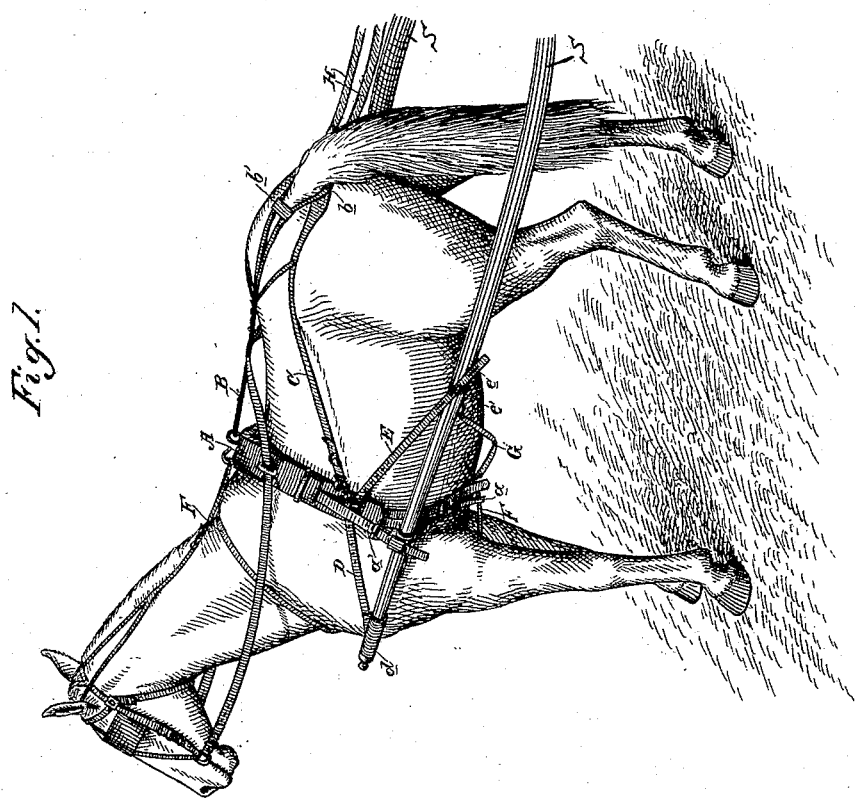

(No Model.) 2 Sheets—Sheet 1.

J. E. FOSTER.
HARNESS.

No. 445,428. Patented Jan. 27, 1891.

Witnesses,
H. C. Lee.

Inventor,
John E. Foster
By Dewey & Co.
Att'ys (No Model.) J. E. FOSTER. 2 Sheets—Sheet 2.
HARNESS.
No. 445,428. Patented Jan. 27, 1891.
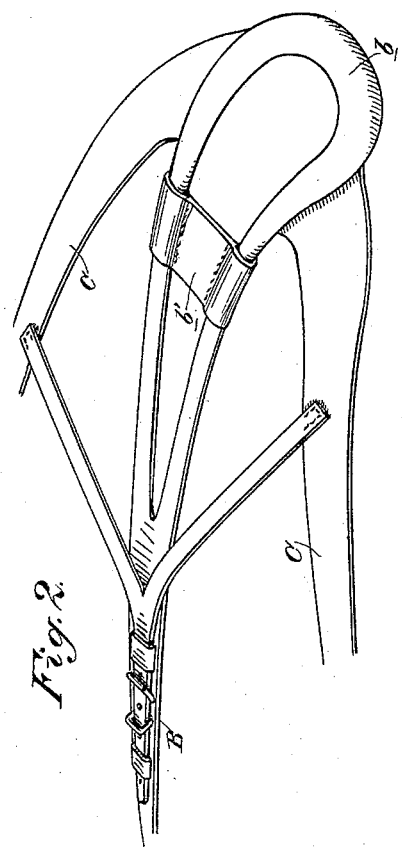
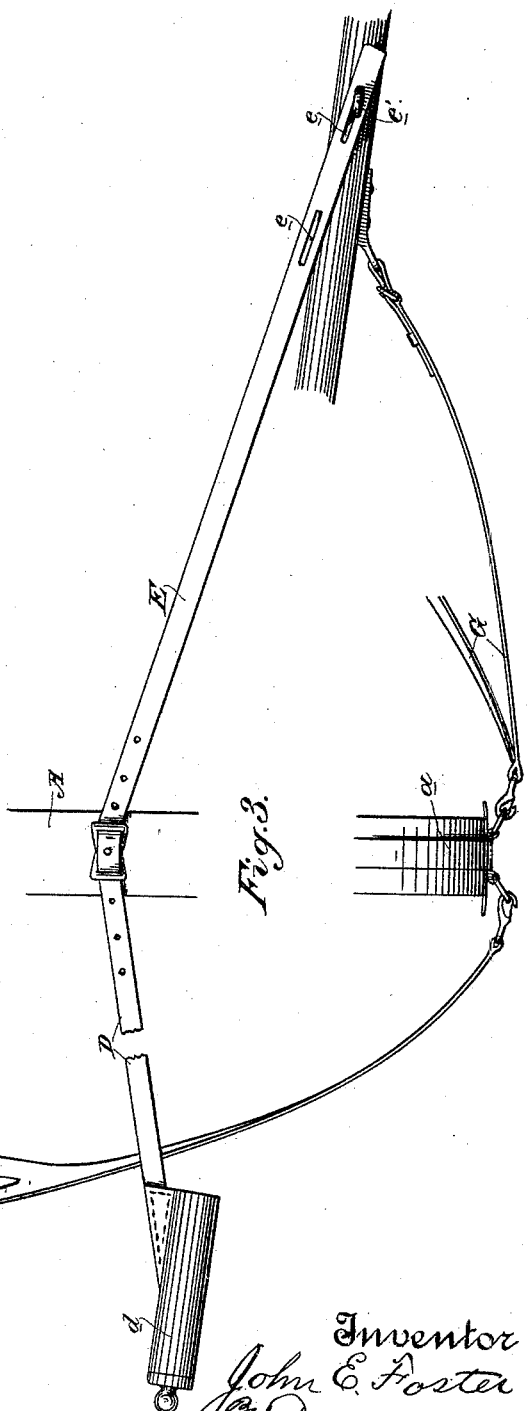

UNITED STATES PATENT OFFICE.

JOHN E. FOSTER, OF FERNDALE, CALIFORNIA.

HARNESS.

SPECIFICATION forming part of Letters Patent No. 445,428, dated January 27, 1891.

Application filed September 12, 1890. Serial No. 364,770. (No model.)

*To all whom it may concern:*

Be it known that I, JOHN E. FOSTER, a citizen of the United States, residing at Ferndale, Humboldt county, State of California, have invented an Improvement in Track-Harness; and I hereby declare the following to be a full, clear, and exact description of the same.

My invention relates to the general class of harness, and especially to a harness adapted for use on the track with a light sulky.

My invention consists in the novel construction and arrangement hereinafter fully described, and specifically pointed out in the claims.

The object of my invention is to provide a track-harness without the use of breeching, breast-strap, or traces, at the same time providing for a perfect holdback and a strong and tight connection with the shafts of the vehicle, which will give the horse perfect freedom.

Referring to the accompanying drawings for a more complete explanation of my invention, Figure 1 is a view showing the application of my harness to a horse. Fig. 2 is a perspective view showing the crupper and the attached holdback-straps. Fig. 3 is a side view of the lower portions of the harness.

A is the saddle, of the usual pattern, provided with a belly-band $a$, and with a holding-down girth $a'$, arranged to fit about the horse and to be connected with the shafts S of the vehicle in the ordinary manner.

B is the back-strap of the harness, having a crupper $b$. A point of novelty in this crupper lies in the unusual length of its opening, as shown, whereby it may be readily fitted about the horse's tail, and it is then properly adjusted and held to place by a sliding band $b'$ upon it. Secured to the sides of the crupper are the holdback-straps C, which extend forwardly over the tops of the hips of the horse and are connected with the saddle at its back edge.

D are straps which are secured at their forward end to the shafts at a point in front of the saddle, and they are secured to said saddle, as shown. They may be secured to the shafts in any suitable manner, a desirable way being to have secured to their outer ends sockets $d$, which fit over the ends of the shaft.

E are straps which are secured at their forward ends to the saddle, and at their rear ends they are provided with a series of holes $e$, which are adapted to engage with suitable lugs $e'$ on the sides of the shafts at a point back of the saddle.

Although the straps D and E may be separate straps, I prefer to make them as a single piece or strap, securing said strap to the saddle by a suitable buckle or other device which may provide for its adjustment.

F is a neck-strap which passes under between the front legs of the horse and is secured to the belly-band underneath.

G are small straps secured to the shafts and thence extending under and secured to the rear side of the belly-band.

Any suitable bridle may be used, of which the lines are here represented by H.

In this class of harness the vehicle is pulled along by the lines in the driver's hands. It will be seen that I have no traces whatever and no connection with the shafts for pulling the vehicle, which is to be drawn by the strain on the lines. The principal feature of the harness rests in the holdback-straps C and the straps D, which constitute the means by which the holdback-strain is resisted. It will be seen that the straps C being attached to the crupper and to the saddle, and the straps D being attached to the saddle and to the forward ends of the shafts, the horse can hold back on the shafts through the straps D and C, while the latter hold the saddle. This relieves the harness of any of the usual hip-straps and breeching. The straps C do not interfere with the flanks of the horse, but give him perfect freedom of movement. The straps E are for the purpose of tightening up the harness, and are to be secured to the shafts after all the other portions are fastened. They simply hold the parts well in place and do not act as traces or tugs. The neck-strap may be dispensed with, but is to be used when a martingale is used. The small straps G are to hold the belly-band against the strain of the neck-strap. There is no breast-strap to be used. The whole harness is neat and simple, attaching the horse perfectly to the vehicle and still allowing him the utmost freedom of movement.

Having thus described my invention, what I claim as new, and desire to secure by Letters Patent, is—

1. In a track-harness, and in combination with the saddle, back-strap, and crupper, the holdback-straps C, secured at their rear ends to the crupper and at their forward ends to the saddle, and the straps D and E, secured at one end to the saddle and at their opposite ends to the shafts at a point forward and back of the saddle, respectively, substantially as herein described.

2. In a track-harness, and in combination with the saddle, back-strap, and crupper, the holdback-straps C, secured at their rear ends to the crupper and at their forward ends to the saddle, the straps D, secured at their rear ends to the saddle and having the sockets secured to their forward ends and adapted to fit over the ends of the shafts, and the straps E, connecting the saddle with the shafts, substantially as herein described.

3. In a track-harness, and in combination with the saddle, back-strap, and crupper, the holdback-straps C, secured at their rear ends to the crupper and at their forward ends to the saddle, the straps D, secured at their rear ends to the saddle and at their forward ends to the shafts at a point in front of the saddle, and the tightening-straps E, secured at their forward ends to the saddle and at their rear ends to the shafts at a point back of the saddle, substantially as herein described.

4. In a track-harness, and in combination with the saddle, back-strap, and crupper, the holdback-straps C, secured at their rear ends to the crupper and at their forward ends to the saddle, and a strap on each side secured at its ends to the shafts at points forward and back of the plane of the saddle and at its intervening portion to said saddle, substantially as herein described.

5. The track-harness consisting of the saddle with its belly-band, the back-strap with its crupper, the holdback-straps secured to the crupper and to the saddle, the straps secured to the shafts at points forward and back of the plane of the saddle and to said saddle, the neck-strap secured at its lower end to the belly-band, and the straps G, secured to the shafts and to the belly-band, substantially as herein described.

6. In a harness, the combination, with the saddle, of the holdback-straps C and the crupper to which said straps are connected, said crupper having an elongated opening, and a band sliding on the crupper, substantially as herein described.

In witness whereof I have hereunto set my hand.

JOHN E. FOSTER.

Witnesses:
S. H. NOURSE,
H. C. LEE.